US012585896B1

(12) United States Patent　　　　(10) Patent No.:　US 12,585,896 B1
Maghakian　　　　　　　　　　　　(45) Date of Patent:　　Mar. 24, 2026

(54) EMBEDDING-FREE RETRIEVER-AUGMENTED GENERATION (RAG) ARCHITECTURES

(71) Applicant: Goldman Sachs & Co. LLC, New York, NY (US)

(72) Inventor: Jessica Maghakian, Brooklyn, NY (US)

(73) Assignee: Goldman Sachs & Co. LLC, New York, NY (US)

( * ) Notice: Subject to any disclaimer, the term of this patent is extended or adjusted under 35 U.S.C. 154(b) by 0 days.

(21) Appl. No.: 19/268,792

(22) Filed: Jul. 14, 2025

Related U.S. Application Data

(60) Provisional application No. 63/717,043, filed on Nov. 6, 2024.

(51) Int. Cl.
　　*G06F 40/58*　　　(2020.01)
(52) U.S. Cl.
　　CPC ................................... *G06F 40/58* (2020.01)
(58) Field of Classification Search
　　CPC ...................................................... G06F 40/58
　　See application file for complete search history.

(56) References Cited

U.S. PATENT DOCUMENTS

| | | | | |
|---|---|---|---|---|
| 8,280,888 | B1 * | 10/2012 | Bierner | ................. G06F 40/284 |
| | | | | 707/738 |
| 10,360,216 | B2 * | 7/2019 | Vandenberg | .......... G06F 16/248 |

| | | | | |
|---|---|---|---|---|
| 11,676,044 | B1 | 6/2023 | Mazza et al. | |
| 12,271,707 | B1 * | 4/2025 | Sivulka | ................. G06F 16/243 |
| 2007/0239662 | A1 * | 10/2007 | Fontes | .................. G06F 16/951 |
| 2010/0223256 | A1 * | 9/2010 | Chalana | ............ G06F 16/24539 |
| | | | | 707/718 |
| 2015/0095017 | A1 | 4/2015 | Mnih et al. | |
| 2019/0336024 | A1 * | 11/2019 | Sgobba | ................ G06N 3/0499 |

(Continued)

FOREIGN PATENT DOCUMENTS

| | | | |
|---|---|---|---|
| KR | 20210151017 A | 12/2021 | |

OTHER PUBLICATIONS

International Search Report and Written Opinion of the International Searching Authority dated Jan. 15, 2025 in connection with International Patent Application No. PCT/US2024/050707, 11 pages.

(Continued)

*Primary Examiner* — Kevin Ky

(57)　　　　　　　ABSTRACT

A method includes obtaining an input query associated with a document and using a first generative AI model to identify whether different passages of the document are or are not relevant to the input query. The method also includes identifying at least one specific passage in the document and extracting text from the document. The extracted text includes each specific passage and portions of text preceding and following that specific passage. The method further includes generating a prompt requesting that the first generative AI model or a second generative AI model generate a response to the input query using the extracted text. Using the first generative AI model includes generating initial prompts requesting that the first generative AI model indicate whether different chunks of the document are or are not relevant to the input query and identifying relevant chunks based on results generated by the first generative AI model.

20 Claims, 8 Drawing Sheets

(56) References Cited

U.S. PATENT DOCUMENTS

| 2020/0057819 A1* | 2/2020 | Mathur | ............... G06F 16/2282 |
| 2021/0319020 A1* | 10/2021 | Walters | ................ G06N 3/0464 |
| 2022/0092266 A1 | 3/2022 | Choi et al. | |
| 2022/0164372 A1* | 5/2022 | Krishna | .............. G06F 16/2255 |
| 2022/0398245 A1* | 12/2022 | Liu | ..................... G06F 16/2453 |
| 2022/0414137 A1 | 12/2022 | Sewak et al. | |
| 2023/0169795 A1* | 6/2023 | Lee | ........................ G06V 10/82 |
| | | | 382/181 |
| 2023/0229710 A1 | 7/2023 | Rosset et al. | |
| 2023/0252549 A1 | 8/2023 | Xie et al. | |
| 2023/0259692 A1 | 8/2023 | Wright | |
| 2023/0297887 A1 | 9/2023 | Gurgu et al. | |
| 2024/0061834 A1 | 2/2024 | Tangari et al. | |
| 2024/0289363 A1* | 8/2024 | Qadrud-Din | ............ G06F 40/56 |

OTHER PUBLICATIONS

Naushan, "Transformer-based Sentence Embeddings", Medium, Dec. 2020, 9 pages.
Heckel et al., "Active Ranking from Pairwise Comparisons and the Futility of Parametric Assumptions", arXiv:1606.08842v1 [cs.LG], Jun. 2016, 27 pages.
Andriopoulos et al., "Augmenting LLMs with Knowledge: A survey on hallucination prevention", arXiv 2023.16459v1 [cs.CL], Sep. 2023, 11 pages.

* cited by examiner

INDICATOR FUNCTION
Prompt the model to return 1 or 0
depending on whether information in
an excerpt is relevant to an input
query.

312 → query + excerpt from text + instruction prompt

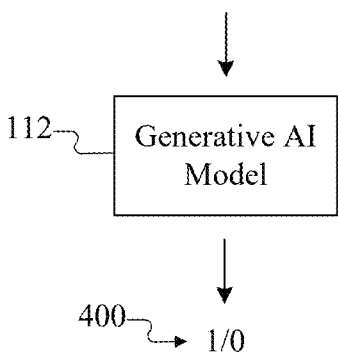

112 — Generative AI Model

QUOTATION GENERATION
Use the model to output one or more quotations in an excerpt that
are relevant to an input query.

314 → query + excerpt from text + instruction prompt

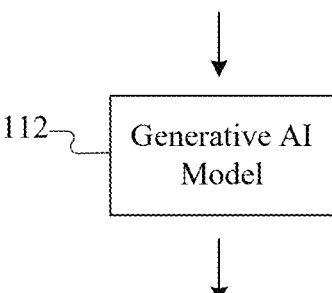

112 — Generative AI Model

402 → ["Their profit margins are similarly lower than those of Chinese
private sector companies and U.S. companies.", ...]

Sentence 45

*318*

Levenshtein distance with each sentence in document to find top match process.extract(sentence, doc_sentences, scorer=fuzz.Wratio, limit=1)

*402*

"Their profit margins are similarly lower than those of Chinese private sector companies and U.S. companies."

EMBEDDING-FREE RETRIEVER-AUGMENTED GENERATION (RAG) ARCHITECTURES

CROSS-REFERENCE TO RELATED APPLICATION AND PRIORITY CLAIM

This application claims priority under 35 U.S.C. § 119 (e) to U.S. Provisional Patent Application No. 63/717,043 filed on Nov. 6, 2024, which is hereby incorporated by reference in its entirety.

TECHNICAL FIELD

This disclosure is generally directed to machine learning systems and processes. More specifically, this disclosure is directed to embedding-free retriever-augmented generation (RAG) architectures.

BACKGROUND

Large language models (LLMs) represent neural networks or other machine learning models that include many parameters (often billions of parameters) and that are trained on large quantities of unlabeled text using self-supervised learning. Many large language models use a transformer-based machine learning architecture and are pre-trained in a generative manner. Large language models can find use in a number of natural language processing (NLP) tasks or other tasks, such as when large language models are used to process input queries from users and generate natural language responses to the input queries.

SUMMARY

This disclosure relates to embedding-free retriever-augmented generation (RAG) architectures.

In a first embodiment, a method includes obtaining an input query associated with a document and using a first generative artificial intelligence (AI) model to identify whether different passages of the document are or are not relevant to the input query. The method also includes identifying at least one specific passage in the document based on results generated by the first generative AI model and extracting text from the document. The extracted text includes, for each specific passage, (i) the specific passage, (ii) a portion of text from the document preceding the specific passage, and (iii) a portion of text from the document following the specific passage. The method further includes generating a prompt requesting that the first generative AI model or a second generative AI model generate a response to the input query using the extracted text from the document. Using the first generative AI model to identify whether different passages of the document are or are not relevant to the input query includes generating initial prompts requesting that the first generative AI model indicate whether different chunks of the document are or are not relevant to the input query and identifying relevant chunks based on results generated by the first generative AI model using the initial prompts.

In a second embodiment, an apparatus includes at least one processing device configured to obtain an input query associated with a document and use a first generative AI model to identify whether different passages of the document are or are not relevant to the input query. The at least one processing device is also configured to identify at least one specific passage in the document based on results generated by the first generative AI model and extract text from the document. The extracted text includes, for each specific passage, (i) the specific passage, (ii) a portion of text from the document preceding the specific passage, and (iii) a portion of text from the document following the specific passage. The at least one processing device is further configured to generate a prompt requesting that the first generative AI model or a second generative AI model generate a response to the input query using the extracted text from the document. To use the first generative AI model to identify whether different passages of the document are or are not relevant to the input query, the at least one processing device is configured to generate initial prompts requesting that the first generative AI model indicate whether different chunks of the document are or are not relevant to the input query and identify relevant chunks based on results generated by the first generative AI model using the initial prompts.

Any single one or any combination of the following features may be used with the first or second embodiment. The at least one specific passage in the document may be identified by generating at least one quotation prompt requesting that the first generative AI model generate at least one quotation based on the input query and identifying the at least one specific passage in the document as being most similar to the at least one generated quotation. Fuzzy matching based on Levenshtein distance may be used to identify the at least one specific passage in the document that is most similar to the at least one generated quotation. The extracted text may include, for each specific passage, (i) the specific passage, (ii) a specified number of sentences from the document preceding the specific passage, and (iii) a specified number of sentences from the document following the specific passage. The specified number of sentences from the document preceding each specific passage may equal the specified number of sentences from the document following that specific passage. A non-transitory computer readable medium may contain instructions that when executed cause at least one processor to perform the method of the first embodiment, optionally along with any of these features or with any combination of these features.

In a third embodiment, a method includes obtaining an input query associated with a document and generating multiple prompts requesting that a first generative AI model indicate whether different passages of the document are or are not relevant to the input query. The method also includes identifying at least one specific passage in the document based on results generated by the first generative AI model using the multiple prompts and extracting text from the document. The extracted text includes, for each specific passage, (i) the specific passage, (ii) a portion of text from the document preceding the specific passage, and (iii) a portion of text from the document following the specific passage. The method further includes generating an additional prompt requesting that the first generative AI model or a second generative AI model generate a response to the input query using the extracted text from the document.

In a fourth embodiment, an apparatus includes at least one processing device configured to obtain an input query associated with a document and generate multiple prompts requesting that a first generative AI model indicate whether different passages of the document are or are not relevant to the input query. The at least one processing device is also configured to identify at least one specific passage in the document based on results generated by the first generative AI model using the multiple prompts and extract text from the document. The extracted text includes, for each specific passage, (i) the specific passage, (ii) a portion of text from the document preceding the specific passage, and (iii) a portion of text from the document following the specific passage. The at least one processing device is further configured to generate an additional prompt requesting that the first generative AI model or a second generative AI model generate a response to the input query using the extracted text from the document.

Any single one or any combination of the following features may be used with the third or fourth embodiment. The multiple prompts may be generated by generating first prompts requesting that the first generative AI model indicate whether different chunks of the document are or are not relevant to the input query and identifying first relevant chunks based on results generated by the first generative AI model using the first prompts. The multiple prompts may be generated further by iteratively generating additional prompts and identifying relevant chunks based on results generated by the first generative AI model using the additional prompts until the identified relevant chunks have a size that is less than or equal to a specified threshold size. The at least one specific passage in the document may be identified by generating at least one quotation prompt requesting that the first generative AI model generate at least one quotation based on the input query and identifying the at least one specific passage in the document as being most similar to the at least one generated quotation. Fuzzy matching based on Levenshtein distance may be used to identify the at least one specific passage in the document that is most similar to the at least one generated quotation. The extracted text may include, for each specific passage, (i) the specific passage, (ii) a specified number of sentences from the document preceding the specific passage, and (iii) a specified number of sentences from the document following the specific passage. The specified number of sentences from the document preceding each specific passage may equal the specified number of sentences from the document following that specific passage. A non-transitory computer readable medium may contain instructions that when executed cause at least one processor to perform the method of the third embodiment, optionally along with any of these features or with any combination of these features.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIGS. 4A and 4B illustrate example operations of an architecture supporting embedding-free retrieval according to this disclosure;

DETAILED DESCRIPTION

Figure 1:
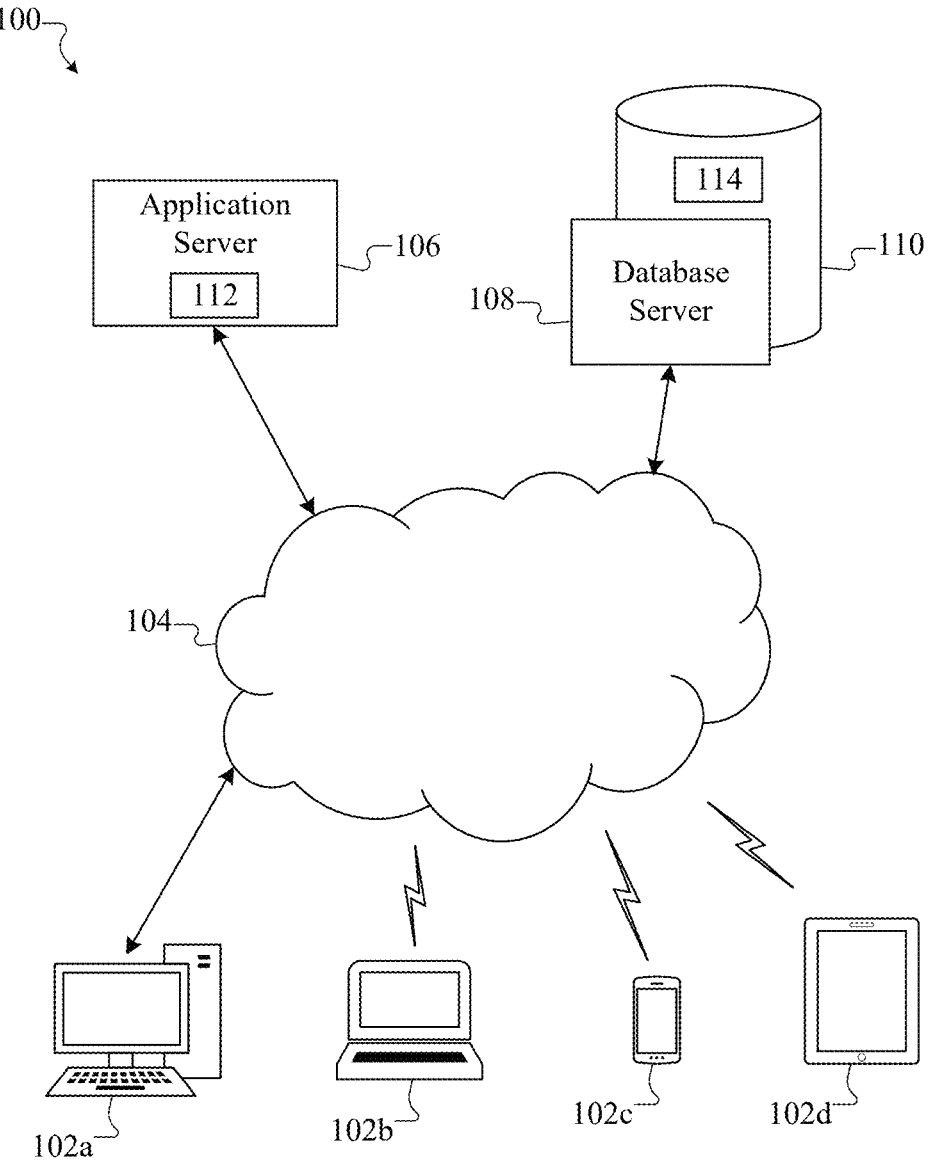
FIG. 1 illustrates an example system supporting an embedding-free retriever-augmented generation (RAG) architecture according to this disclosure.

FIGS. 1 through 7, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

As noted above, large language models (LLMs) represent neural networks or other machine learning models that include many parameters (often billions of parameters) and that are trained on large quantities of unlabeled text using self-supervised learning. Many large language models use a transformer-based machine learning architecture and are pre-trained in a generative manner. Large language models can find use in a number of natural language processing (NLP) tasks or other tasks, such as when large language models are used to process input queries from users and generate natural language responses to the input queries.

Retriever-augmented generation (RAG)-based retrieval systems typically use embedders in their retrieval stage, where the embedders create embeddings of information within a given embedding space. While this can be effective, embedders can suffer from various shortcomings. For example, general-purpose embedders often function poorly when used with a corpus associated with a specialized domain like finance or healthcare. Customizing an embedder can represent a complex, lengthy, and expensive process. It is often not clear ahead of time which embedder is best for a specific corpus, and (depending on the domain of the use-case) a new fine-tuned embedder might even be necessary. Also, embedders are often associated with a large number of hyperparameters that need to be customized, which often requires specialized knowledge. Even after an appropriate embedder is identified, many other retrieval components often need to be tuned to create a final configured RAG pipeline that consistently performs well for a given use-case. Without these operations, RAG pipelines can often fail and provide false answers to user queries since correct chunks of information are not identified and retrieved for use. For situations in which users want to query on ad-hoc documents, correctly setting embedder hyperparameters may not be feasible, and poorly-configured embedders can result in high failure rates for retrieving correct portions of documents.

This disclosure provides various embedding-free RAG architectures in which an LLM or other generative AI model can be used to identify which portions of a specified document are relevant to an input query. This allows the generative AI model to be used in a broader algorithmic framework that can mimic the retrieval stage of a RAG pipeline on a document without actually using an embedder. Among other things, this can help to reduce or eliminate the need to train a retriever model containing an embedder for use in a RAG pipeline.

FIG. 1 illustrates an example system 100 supporting an embedding-free RAG architecture according to this disclosure. As shown in FIG. 1, the system 100 includes multiple user devices 102a-102d, at least one network 104, at least one application server 106, and at least one database server 108 associated with at least one database 110. Note, however, that other combinations and arrangements of components may also be used here.

In this example, each user device 102a-102d is coupled to or communicates over the network(s) 104. Communications between each user device 102a-102d and at least one network 104 may occur in any suitable manner, such as via a wired or wireless connection. Each user device 102a-102d represents any suitable device or system used by at least one user to provide information to the application server 106 or database server 108 or to receive information from the application server 106 or database server 108. Any suitable number(s) and type(s) of user devices 102a-102d may be used in the system 100. In this particular example, the user device 102a represents a desktop computer, the user device 102b represents a laptop computer, the user device 102c represents a smartphone, and the user device 102d represents a tablet computer. However, any other or additional types of user devices may be used in the system 100. Each user device 102a-102d includes any suitable structure configured to transmit and/or receive information, such as devices that can transmit user input queries and that can receive and present responses to the user input queries.

The at least one network 104 facilitates communication between various components of the system 100. For example, the network(s) 104 may communicate Internet Protocol (IP) packets, frame relay frames, Asynchronous Transfer Mode (ATM) cells, or other suitable information between network addresses. The network(s) 104 may include one or more local area networks (LANs), metropolitan area networks (MANs), wide area networks (WANs), all or a portion of a global network such as the Internet, or any other communication system or systems at one or more locations. The network(s) 104 may also operate according to any appropriate communication protocol or protocols.

The application server 106 is coupled to the at least one network 104 and is coupled to or otherwise communicates with the database server 108. The application server 106 supports various functions related to an embedding-free RAG architecture. For example, the application server 106 may perform various operations using a framework that includes one or more generative models 112. The one or more generative models 112 are configured to receive and process input queries and identify one or more relevant chunks of information associated with each input query. The one or more generative models 112 are also configured to process the relevant chunks of information and generate responses to the input queries.

The relevant chunks of information may be identified from documents, websites, or any other suitable source(s) of information. In some cases, for instance, the database 110 may store various documents 114 from which the relevant chunks of information may be extracted. Each document 114 represents any suitable information from any suitable source (s). Each document 114 may also have any suitable form, such as a word processing document (like a MICROSOFT WORD document), image document (such as an ADOBE PDF document), text file, or other file containing information.

Each generative model 112 is configured to process the relevant chunk(s) associated with an input query and generate an output (such as a natural language output) for that input query. In some cases, at least one generative model 112 can represent at least one large language model or other machine learning model. Note that, in some embodiments, the same generative model 112 can be used to identify relevant chunks of information from at least one document 114 and to generate a response to an input query using the relevant chunks of information. In other cases, different generative models 112 can be used to identify relevant chunks of information from at least one document 114 and to generate a response to an input query using the relevant chunks of information. In either case, this can help to reduce or eliminate the need for using a retriever model that contains an embedder.

The database server 108 operates to store and facilitate retrieval of various information used, generated, or collected by the application server 106 and the user devices 102a-102d in the database 110. For example, the database server 108 may store the various documents 114 from which relevant chunks of information may be extracted by the generative model(s) 112. While the database server 108 and database 110 are shown here as being separate from the application server 106, the application server 106 may itself incorporate the database server 108 and the database 110.

Although FIG. 1 illustrates one example of a system 100 supporting an embedding-free RAG architecture, various changes may be made to FIG. 1. For example, the system 100 may include any number of user devices 102a-102d, networks 104, application servers 106, database servers 108, databases 110, generative models 112, and documents 114. Also, these components may be located in any suitable locations and might be distributed over a large area. In addition, while FIG. 1 illustrates one example operational environment in which an embedding-free RAG architecture may be used, this functionality may be used in any other suitable system.

Figure 2:
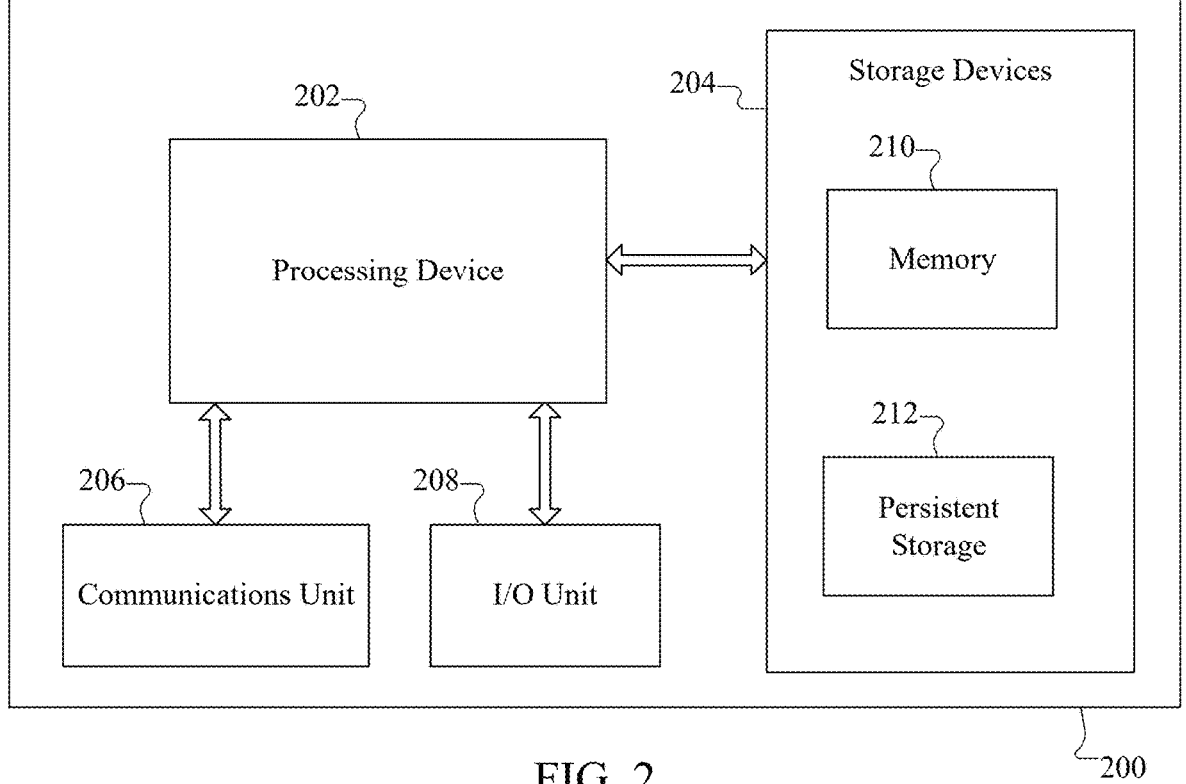
FIG. 2 illustrates an example device supporting an embedding-free RAG architecture according to this disclosure.

FIG. 2 illustrates an example device 200 supporting an embedding-free RAG architecture according to this disclosure. One or more instances of the device 200 may, for example, be used to at least partially implement the functionality of the application server 106 of FIG. 1. However, the functionality of the application server 106 may be implemented in any other suitable manner. In some embodiments, the device 200 shown in FIG. 2 may form at least part of a user device 102a-102d, application server 106, or database server 108 in FIG. 1. However, each of these components may be implemented in any other suitable manner.

As shown in FIG. 2, the device 200 denotes a computing device or system that includes at least one processing device 202, at least one storage device 204, at least one communications unit 206, and at least one input/output (I/O) unit 208. The processing device 202 may execute instructions that can be loaded into a memory 210. The processing device 202 includes any suitable number(s) and type(s) of processors or other processing devices in any suitable arrangement. Example types of processing devices 202 include one or more microprocessors, microcontrollers, digital signal processors (DSPs), application specific integrated circuits (ASICs), field programmable gate arrays (FPGAs), neural processing units (NPUs), graphics processing units (GPUs), or discrete circuitry.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, Flash memory, or optical disc.

The communications unit 206 supports communications with other systems or devices. For example, the communications unit 206 can include a network interface card or a wireless transceiver facilitating communications over a wired or wireless network. The communications unit 206 may support communications through any suitable physical or wireless communication link(s). As a particular example, the communications unit 206 may support communication over the network(s) 104 of FIG. 1.

The I/O unit 208 allows for input and output of data. For example, the I/O unit 208 may provide a connection for user input through a keyboard, mouse, keypad, touchscreen, or other suitable input device. The I/O unit 208 may also send output to a display, printer, or other suitable output device. Note, however, that the I/O unit 208 may be omitted if the device 200 does not require local I/O, such as when the device 200 represents a server or other device that can be accessed remotely.

In some embodiments, the instructions executed by the processing device 202 include instructions that implement or support the use of the generative model(s) 112. Thus, for example, the instructions executed by the processing device 202 may cause the device 200 to obtain input queries, process the input queries using one or more generative models 112 to identify relevant information chunks, and process the relevant information chunks using one or more generative models 112 (possibly the same generative model or models 112) to generate outputs for users that are responsive to the input queries.

Although FIG. 2 illustrates one example of a device 200 supporting an embedding-free RAG architecture, various changes may be made to FIG. 2. For example, computing and communication devices and systems come in a wide variety of configurations, and FIG. 2 does not limit this disclosure to any particular computing or communication device or system.

Figure 3A:
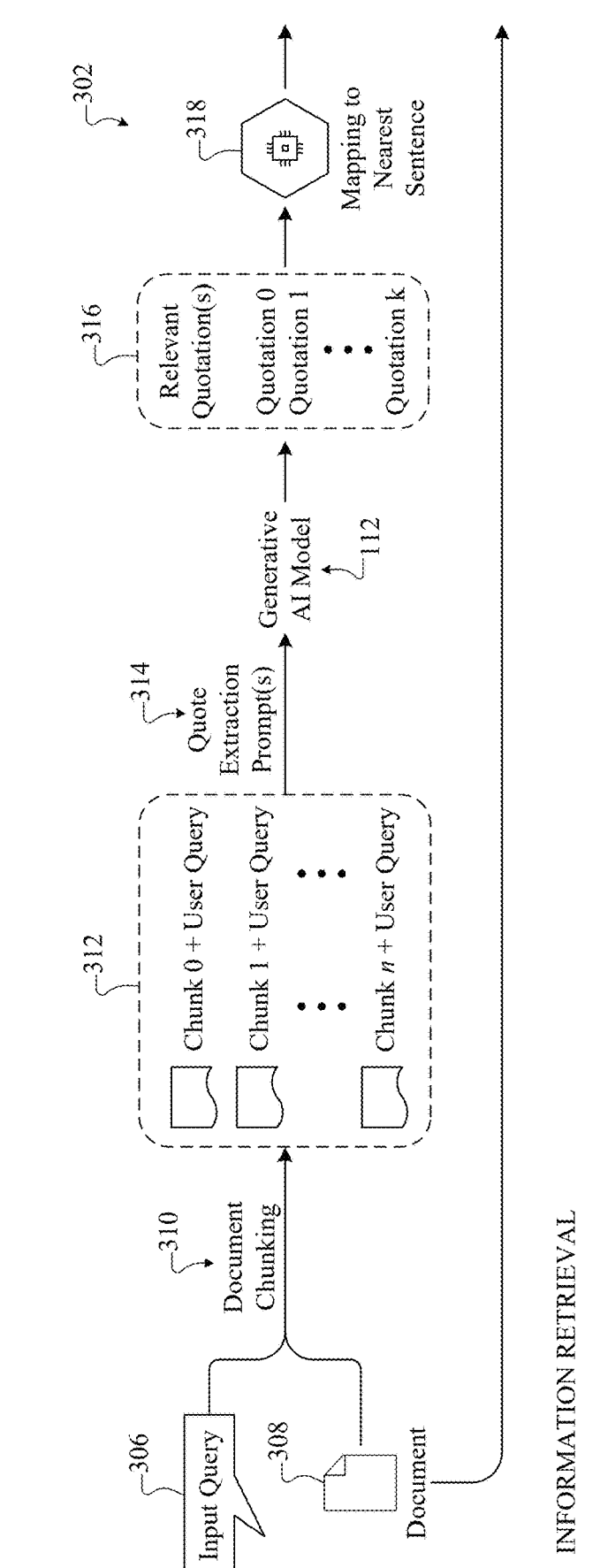
FIGS. 3A and 3B illustrate an example architecture supporting embedding-free retrieval according to this disclosure.
Figure 3B:
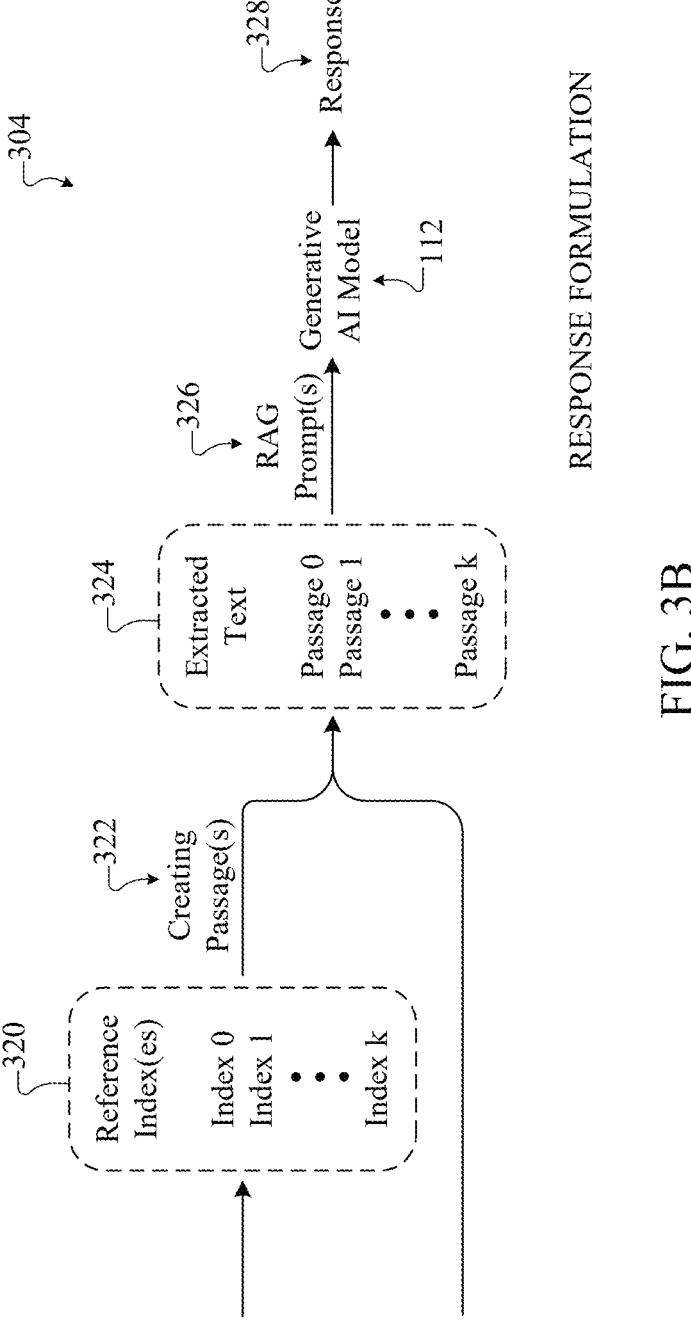

FIGS. 3A and 3B illustrate an example architecture 300 supporting embedding-free retrieval according to this disclosure. For ease of explanation, the architecture 300 of FIGS. 3A and 3B is described as being implemented using the application server 106 in the system 100 of FIG. 1, where the application server 106 may be implemented using one or more instances of the device 200 of FIG. 2. However, the architecture 300 may be implemented using any other suitable device(s) and in any other suitable system(s).

As shown in FIGS. 3A and 3B, the architecture 300 generally includes an information retrieval operation 302 and a response formulation operation 304. The information retrieval operation 302 obtains an input query 306 and a document 308 as inputs, where the input query 306 requests that an LLM or other generative model 112 produce an answer or other response based on the document 308. In some cases, the input query 306 may be provided by one of the user devices 102a-102d, and the document 308 may be provided by that user device 102a-102d or retrieved (such as from the database 110).

A document chunking function 310 divides the document 308 into chunks, where each chunk represents a portion (but not all) of the document 308. Each chunk may represent any suitable portion of the document 308, such as one or more sentences or one or more paragraphs. Various initial prompts 312 can be generated by combining each chunk with the input query 306, possibly along with other information (such as an instruction prompt). The initial prompts 312 are provided to a generative model 112 (such as an LLM), and the initial prompts 312 ask the generative model 112 to determine whether individual chunks appear relevant or not relevant to the input query 306. For individual chunks that appear relevant, additional prompts 314 (which may be referred to as "quote extraction" or "quotation" prompts) can be generated and provided to the generative model 112. The additional prompts 314 can be used to request that the generative model 112 output quotations from the individual chunks, where those quotations appear relevant to the input query 306. This leads to the generation of a set of relevant quotations 316 based on the document 308, where the relevant quotations 316 represent or are associated with portions of the document 308 that appear relevant to the input query 306.

A mapping process 318 is used to identify which sentences or other portions from the document 308 include or are associated with the relevant quotations 316 identified by the generative model 112. This can result in the generation of a set of reference indexes 320, which can identify the sentences or other portions of the document 308 that include or are associated with the relevant quotations 316. The mapping process 318 can use any suitable technique to identify sentences or other portions of documents that include or are associated with relevant quotations. In some cases, for instance, fuzzy matching (such as one based on Levenshtein distance) may be used by the mapping process 318 to map the relevant quotations 316 to sentences or other portions of the document 308.

The reference indexes 320 are provided to a passage creation function 322, which uses the reference indexes 320 to extract relevant passages from the document 308 and produce extracted text 324. Each relevant passage can include at least one sentence or other portion of the document 308 identified by one or more of the reference indexes 320. In some cases, for instance, the passage creation function 322 can generate each relevant passage by extracting a specified sentence from the document 308 along with one or more preceding sentences and one or more subsequent sentences. The extracted text 324 can be used to form a RAG prompt 326, which represents a combination of the input query 306, the extracted text 324 (the relevant passage(s) from the document 308), and possibly other information (such as an instruction prompt).

The response formulation operation 304 generally involves providing the RAG prompt 326 to a generative model 112, which may or may not represent the generative model 112 used to identify the relevant portions of the document 308. The RAG prompt 326 requests that the generative model 112 generate a response 328, such as an answer to the input query 306, based on the extracted text 324 from the document 308. The response 328 may be used in any suitable manner, such as by providing the response 328 to the user device 102a-102d that provided the input query 306.

Using the approach shown here, one or more portions of a specified document 308 can be identified as being relevant to an input query 306. In some cases, a generative model 112 may be asked to generate binary outputs in response to the initial prompts 312, such as a "1" to indicate that a portion of the document 308 is relevant and a "0" to indicate that a portion of the document 308 is not relevant. In some embodiments, the generative model 112 can be used to identify relevant chunks from the document 308 in a one-shot process. In other words, the generative model 112 can be queried once to identify the relevant chunks from the specified document 308. In other embodiments, the identification of relevant chunks can be done iteratively. For example, the generative model 112 may be queried to identify which of larger chunks from a specified document

308 are relevant to an input query 306. The irrelevant chunks can be dropped, and the remaining relevant chunks can be subjected to an additional chunking process, meaning the generative model 112 can be queried using smaller parts of the remaining chunks to again generate binary outputs identifying which parts of the remaining chunks are relevant.

Using either approach, a set of relevant quotations 316 can be identified associated with the document 308. The relevant quotations 316 are used to identify specific sentences or other portions of the document 308 via the mapping process 318, allowing specific passages to be extracted from the document 308. In some cases, each specific passage can be extracted from the document 308 along with part of the document 308 prior to the specific passage and part of the document 308 after the specific passage. As a particular example, the specific passage can be extracted along with a specified number of sentences from the document 308 preceding the specific passage and a specified number of sentences from the document 308 following the specific passage. The specified number of sentences from the document 308 preceding the specific passage may or may not equal the specified number of sentences from the document 308 following the specific passage. The extracted text can be provided to the same generative model 112 or to a different generative model 112 for use in generating the response 328 to the input query 306. This approach therefore enables use of one or more generative models 112 without needing to use a retriever with an embedding model.

Among other use cases, this approach supports "bring your own document" functionality to a generative AI platform or other platform. While the assumption in a traditional RAG framework is that it is unknown which document is relevant to each user query and that the possible input space is a large corpus, many users in practice often want to ask questions about specific documents. This represents a paradigm change in the traditional RAG framework since a document may only be processed at inference time and may undergo little if any pre-processing. Specific examples of where this functionality might be useful could include on-the-fly question and answer scenarios in which explainability and sourcing are desired or required, domain areas where it is known that an embedder's performance could be lacking, and for problems where traditional semantic searches cannot capture complexities of information.

FIGS. 4A and 4B illustrate example operations of the architecture 300 supporting embedding-free retrieval according to this disclosure. As shown in FIG. 4A, a generative model 112 can be queried using the initial prompts 312, which can cause the generative model 112 to generate outputs 400 indicative of whether different portions (excerpts) of the document 308 may or may not be relevant to the input query 306. In this example, each of the initial prompts 312 includes the input query 306 and an excerpt (chunk) from the document 308. Each of the initial prompts 312 also includes an instruction prompt, which can instruct the generative model 112 to determine whether the chunk is relevant to the input query 306. Also, in this example, the outputs 400 are binary (one or zero), although other types of outputs may be generated.

As shown in FIG. 4B, the generative model 112 can be queried using the quote extraction prompts 314, which can cause the generative model 112 to generate outputs 402 containing the relevant quotations 316. In this example, each of the quote extraction prompts 314 includes the input query 306 and an excerpt (chunk) from the document 308 that the generative model 112 previously determined may be relevant to the input query 306. Each of the quote extraction prompts 314 also includes an instruction prompt, which can instruct the generative model 112 to determine the quotation(s) 316 within each chunk relevant to the input query 306.

Figure 5:
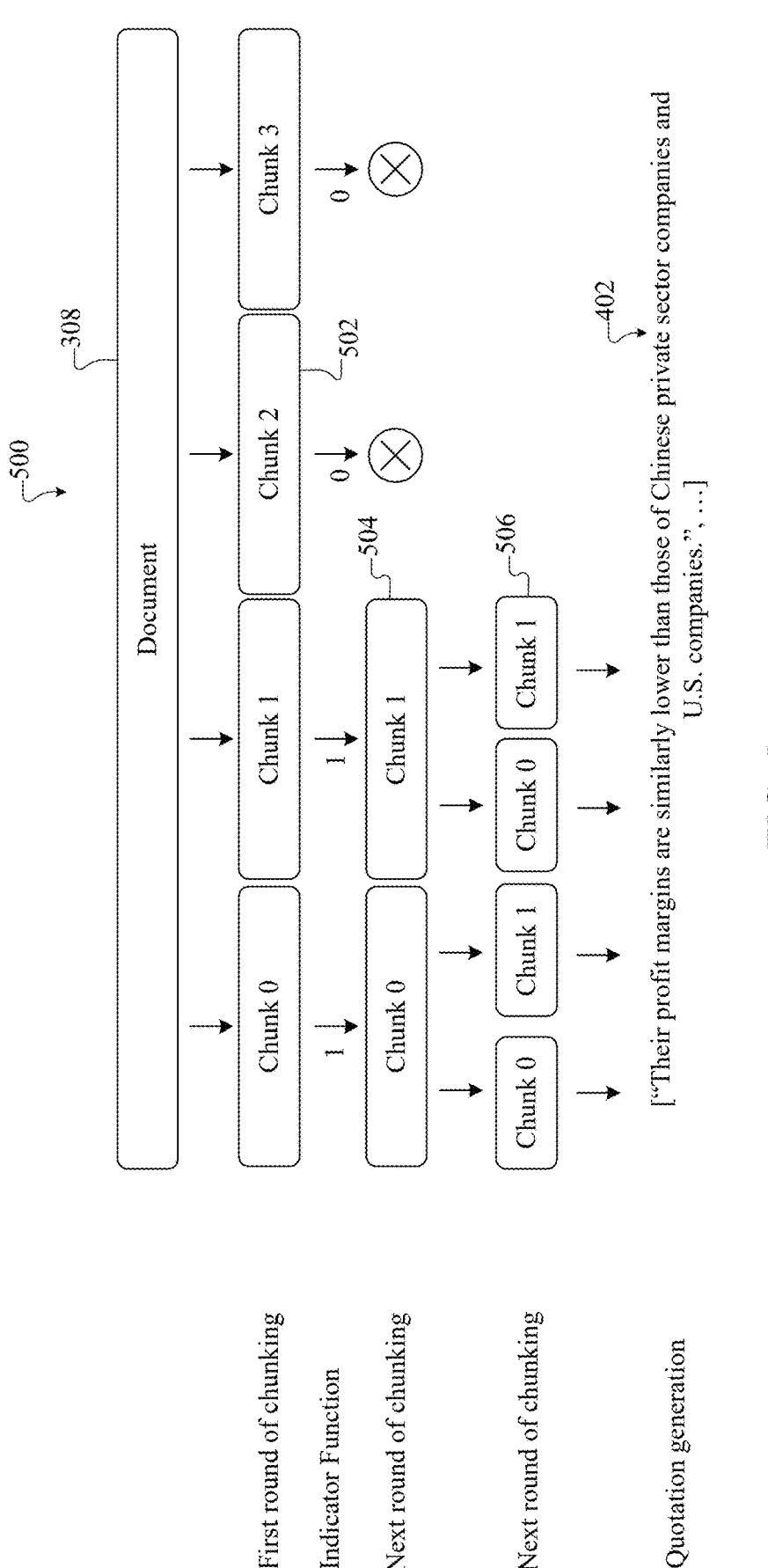
FIG. 5 illustrates an example optional iterative process supporting embedding-free retrieval according to this disclosure.

FIG. 5 illustrates an example (optional) iterative process 500 supporting embedding-free retrieval according to this disclosure. As noted above, a generative model 112 may be used to identify relevant chunks in a one-shot process, which is the approach shown in FIGS. 3A and 3B. An iterative process 500 as shown in FIG. 5 may be used in other embodiments, where chunks 502-506 of progressively smaller sizes are selected from a document 308 in an iterative fashion. For example, the document 308 may be divided into relatively large chunks 502, and the generative model 112 can be queried to determine which chunks 502 (if any) are relevant to an input query 306. The relevant chunks 502 can be divided into smaller chunks 504, and the generative model 112 can be queried to determine which chunks 504 (if any) are relevant to an input query 306. If needed or desired, the relevant chunks 504 can be divided into even smaller chunks 506, and the generative model 112 can be queried to determine which chunks 506 (if any) are relevant to an input query 306. Eventually, the chunks can be used to generate an output 402 in the form of a quotation.

Figure 6:
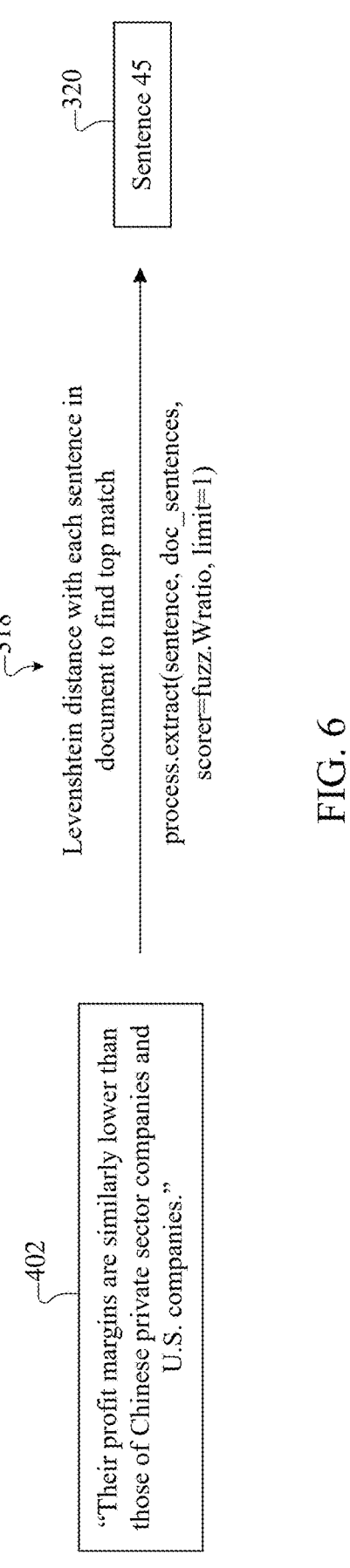
FIG. 6 illustrates an example mapping of generated quotations to document segments by an embedding-free RAG architecture according to this disclosure.

FIG. 6 illustrates an example mapping 600 of generated quotations to document segments by the embedding-free RAG architecture 300 according to this disclosure. The mapping 600 here can be performed by the mapping process 318 to map an output 402 (a quotation, such as one of the relevant quotations 316) in order to identify a reference index 320 for that quotation. In some embodiments, the mapping process 318 can be based on Levenshtein distance, although other measures of similarity or dissimilarity may be used here. The reference index 320 can be used as described above to extract a passage from the document 308, and that passage can be included in the RAG prompt 326.

Although FIGS. 3A through 6 illustrate one example of an architecture 300 supporting embedding-free retrieval and related details, various changes may be made to FIGS. 3A through 6. For example, any number of initial prompts 312 and quote extraction prompts 314 may be generated, and any number of relevant quotations 316, reference indexes 320, and passages/extracted text 324 may be identified. Also, the initial prompts 312 and quote extraction prompts 314 may each have any suitable form. In addition, if the iterative process 500 is used, any number of iterations may be performed.

Figure 7:
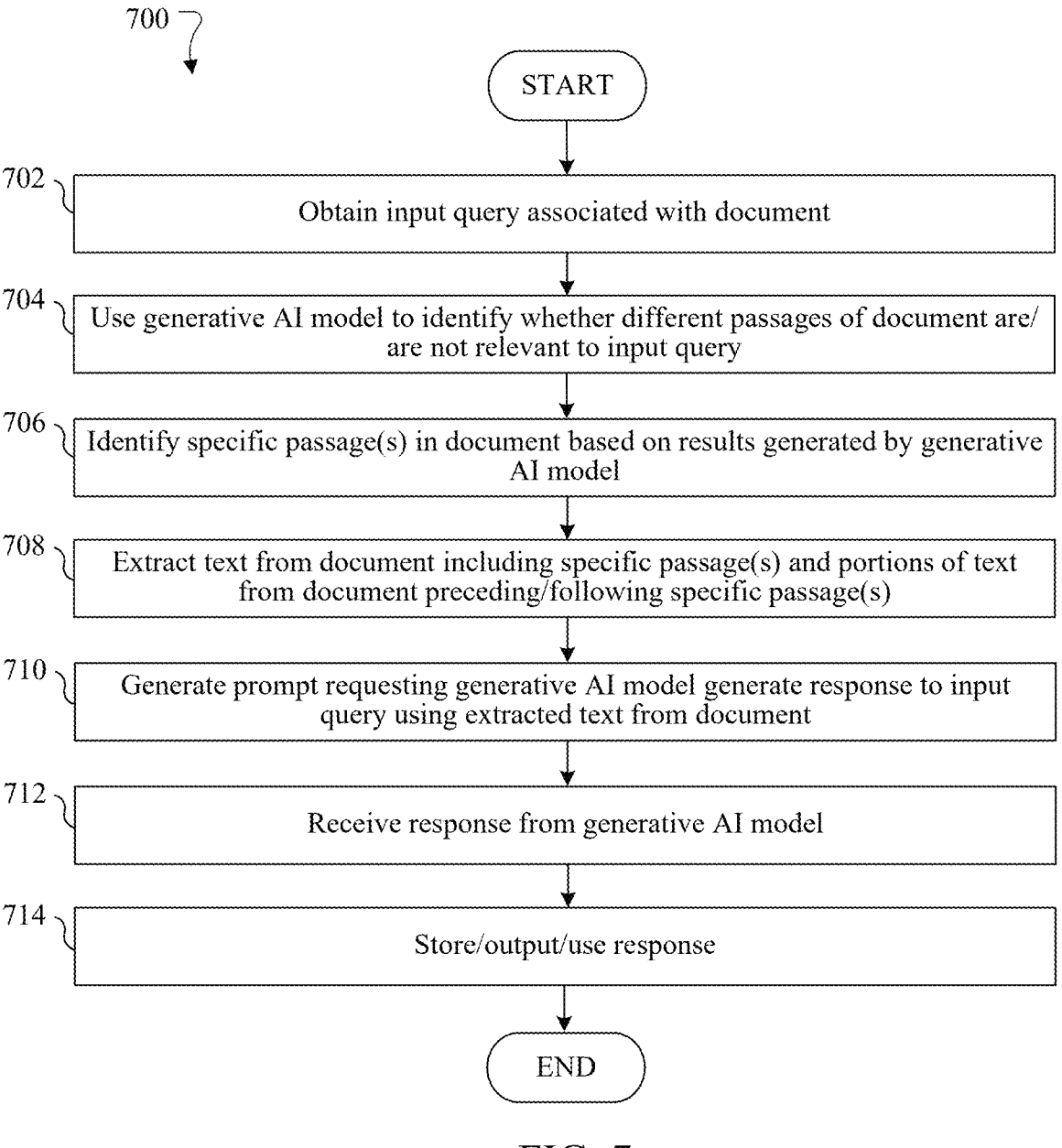
FIG. 7 illustrates an example method for embedding-free retriever-augmented generation according to this disclosure.

FIG. 7 illustrates an example method 700 for embedding-free retriever-augmented generation according to this disclosure. For ease of explanation, the method 700 of FIG. 7 is described as being performed using the application server 106 in the system 100 of FIG. 1, where the application server 106 may be implemented using one or more instances of the device 200 of FIG. 2 and may implement the architecture 300 of FIGS. 3A and 3B. However, the method 700 may be performed using any other suitable device(s) and architecture(s) and in any other suitable system(s).

As shown in FIG. 7, an input query associated with a document is obtained at step 702. This may include, for example, the processing device 202 of the application server 106 receiving an input query 306 from a user, such as from a user device 102a-102d associated with the user. The input query 306 may include, identify, or otherwise be associated with a document 308. For instance, the input query 306 may ask a question that can be answered using contents of the document 308. As a particular example, the application server 106 may support a chat-based service in which users may interact with a generative model 112 via a chatbot, and the input query 306 and optionally the document 308 (or information associated with the document 308) may be received via a chat message.

A generative AI model is used to identify whether different passages of the document are and are not relevant to the input query at step 704. This may include, for example, the processing device 202 of the application server 106 chunking the document 308 into different chunks and generating initial prompts 312 requesting that an LLM or other generative model 112 indicate whether the different chunks of the document 308 are or are not relevant to the input query 306. Relevant chunks can thereby be identified based on the results generated by the generative model 112 using the initial prompts 312. Note that, in some cases, this may occur iteratively, such as in the manner shown in FIG. 5.

At least one specific passage in the document is identified based on the results generated by the generative AI model at step 706. This may include, for example, the processing device 202 of the application server 106 generating at least one quotation prompt 314 requesting that the generative model 112 generate at least one quotation 316 based on the input query 306. This may also include the processing device 202 of the application server 106 identifying the at least one specific passage in the document 308 as being most similar to the at least one quotation 316. For instance, fuzzy matching based on Levenshtein distance may be used to identify the at least one specific passage in the document 308 that is most similar to the at least one generated quotation 316.

Text from the document, including each specific passage and portions of text from the document preceding and following each specific passage, is extracted at step 708. This may include, for example, the processing device 202 of the application server 106 generating extracted text 324 from the document 308, where the extracted text 324 includes each portion of the document 308 identified as being relevant, along with a portion of the document 308 preceding the identified portion and a portion of the document 308 following the identified portion. In some cases, the extracted text may include, for each specific passage, (i) the specific passage, (ii) a specified number of sentences from the document preceding the specific passage, and (iii) a specified number of sentences from the document following the specific passage. The specified number of sentences from the document preceding each specific passage may or may not equal the specified number of sentences from the document following that specific passage.

A prompt requesting that the same generative AI model or a different generative AI model generate a response to the input query using the extracted text from the document is generated at step 710. This may include, for example, the processing device 202 of the application server 106 generating an additional prompt, such as a RAG prompt 326, which represents a combination of the input query 306 and the extracted text 324 (possibly along with an instruction prompt). This may also include the processing device 202 of the application server 106 providing the generated prompt to the same generative model 112 that identified the extracted text 324 or to a different generative model 112.

A response to the prompt is received from the prompted generative AI model at step 712 and stored, output, or used in any suitable manner at step 714. This may include, for example, the processing device 202 of the application server 106 receiving a response 328 from the prompted generative model 112. This may also include the processing device 202 of the application server 106 performing any desired postprocessing of the response 328, such as verifying whether the response 328 appears to have actual support in the document 308. In some cases, this may be done by prompting the generative model 112 to identify what portion or portions of the document 308 support the generated response 328, which may be done to help reduce or avoid hallucination by the generative model 112. This may further include the processing device 202 of the application server 106 providing the response 328 to the user who provided the input query 306, such as by displaying the response 328 or providing the response 328 to the user via a chat message.

Although FIG. 7 illustrates one example of a method 700 for embedding-free retriever-augmented generation, various changes may be made to FIG. 7. For example, while shown as a series of steps, various steps in FIG. 7 may overlap, occur in parallel, occur in a different order, or occur any number of times (including zero times).

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive (HDD), a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise", as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112 (f) with respect to any of the appended claims or claim elements unless the exact words "means for" or "step for" are explicitly used in the particular claim, followed by a participle phrase identifying a function. Use of terms such as (but not limited to) "mechanism", "module", "device", "unit", "component", "element", "member", "apparatus", "machine", "system", "processor", or "controller" within a claim is understood and intended to refer to structures known to those skilled in the relevant art, as further modified or enhanced by the features of the claims themselves, and is not intended to invoke 35 U.S.C. § 112 (f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
obtaining, from a user, an input query associated with a document;
using a first generative artificial intelligence (AI) model to identify whether different passages of the document are or are not relevant to the input query;
identifying at least one specific passage in the document based on results generated by the first generative AI model;
extracting text from the document, the extracted text including, for each specific passage, (i) the specific passage, (ii) a portion of text from the document preceding the specific passage, and (iii) a portion of text from the document following the specific passage;
generating a prompt requesting that the first generative AI model or a second generative AI model generate a response to the input query using the extracted text from the document; and
providing the response to the user by initiating display of the response;
wherein using the first generative AI model to identify whether different passages of the document are or are not relevant to the input query comprises:
generating initial prompts requesting that the first generative AI model indicate whether different chunks of the document are or are not relevant to the input query;
identifying initial relevant chunks based on results generated by the first generative AI model using the initial prompts; and
iteratively generating additional prompts and identifying relevant chunks based on results generated by the first generative AI model using the additional prompts until the identified relevant chunks have a size that is less than or equal to a specified threshold size.

2. The method of claim 1, wherein identifying the at least one specific passage in the document comprises:
generating at least one quotation prompt requesting that the first generative AI model generate at least one quotation based on the input query; and
identifying the at least one specific passage in the document as being most similar to the at least one generated quotation.

3. The method of claim 2, wherein fuzzy matching based on Levenshtein distance is used to identify the at least one specific passage in the document that is most similar to the at least one generated quotation.

4. The method of claim 1, wherein the extracted text includes, for each specific passage, (i) the specific passage, (ii) a specified number of sentences from the document preceding the specific passage, and (iii) a specified number of sentences from the document following the specific passage.

5. The method of claim 4, wherein the specified number of sentences from the document preceding each specific passage equals the specified number of sentences from the document following that specific passage.

6. The method of claim 1, wherein the document is obtained via a communications network from a user device that also provides the input query.

7. The method of claim 1, wherein extracting the text from the document comprises extracting text from the document without using an embedding model.

8. An apparatus comprising:
at least one processing device configured to:
obtain, from a user, an input query associated with a document;
use a first generative artificial intelligence (AI) model to identify whether different passages of the document are or are not relevant to the input query;
identify at least one specific passage in the document based on results generated by the first generative AI model;
extract text from the document, the extracted text including, for each specific passage, (i) the specific passage, (ii) a portion of text from the document preceding the specific passage, and (iii) a portion of text from the document following the specific passage;
generate a prompt requesting that the first generative AI model or a second generative AI model generate a response to the input query using the extracted text from the document; and
provide the response to the user by initiating display of the response;
wherein, to use the first generative AI model to identify whether different passages of the document are or are not relevant to the input query, the at least one processing device is configured to:
generate initial prompts requesting that the first generative AI model indicate whether different chunks of the document are or are not relevant to the input query;
identify initial relevant chunks based on results generated by the first generative AI model using the initial prompts; and
iteratively generate additional prompts and identify relevant chunks based on results generated by the first generative AI model using the additional prompts until the identified relevant chunks have a size that is less than or equal to a specified threshold size.

9. The apparatus of claim 8, wherein, to identify the at least one specific passage in the document, the at least one processing device is configured to:
generate at least one quotation prompt requesting that the first generative AI model generate at least one quotation based on the input query; and
identify the at least one specific passage in the document as being most similar to the at least one generated quotation.

10. The apparatus of claim 9, wherein the at least one processing device is configured to use fuzzy matching based on Levenshtein distance to identify the at least one specific passage in the document that is most similar to the at least one generated quotation.

11. The apparatus of claim 8, wherein the extracted text includes, for each specific passage, (i) the specific passage, (ii) a specified number of sentences from the document preceding the specific passage, and (iii) a specified number of sentences from the document following the specific passage.

12. The apparatus of claim 11, wherein the specified number of sentences from the document preceding each specific passage equals the specified number of sentences from the document following that specific passage.

13. A method comprising:
obtaining, from a user, an input query associated with a document;
generating multiple prompts requesting that a first generative artificial intelligence (AI) model indicate whether different passages of the document are or are not relevant to the input query;
identifying at least one specific passage in the document based on results generated by the first generative AI model using the multiple prompts;
extracting text from the document, the extracted text including, for each specific passage, (i) the specific passage, (ii) a portion of text from the document preceding the specific passage, and (iii) a portion of text from the document following the specific passage;
generating an additional prompt requesting that the first generative AI model or a second generative AI model generate a response to the input query using the extracted text from the document; and
providing the response to the user by initiating display of the response;
wherein generating the multiple prompts comprises:
generating first prompts;
identifying relevant chunks based on results generated by the first generative AI model using the first prompts; and
iteratively generating additional prompts and identifying relevant chunks based on results generated by the first generative AI model using the additional prompts until the identified relevant chunks have a size that is less than or equal to a specified threshold size.

14. The method of claim 11, wherein identifying the at least one specific passage in the document comprises:
generating at least one quotation prompt requesting that the first generative AI model generate at least one quotation based on the input query; and
identifying the at least one specific passage in the document as being most similar to the at least one generated quotation.

15. The method of claim 14, wherein fuzzy matching based on Levenshtein distance is used to identify the at least one specific passage in the document that is most similar to the at least one generated quotation.

16. The method of claim 11, wherein the extracted text includes, for each specific passage, (i) the specific passage, (ii) a specified number of sentences from the document preceding the specific passage, and (iii) a specified number of sentences from the document following the specific passage.

17. The method of claim 16, wherein the specified number of sentences from the document preceding each specific passage equals the specified number of sentences from the document following that specific passage.

18. The method of claim 13, wherein the document is obtained via a communications network from a user device that also provides the input query.

19. The method of claim 13, wherein extracting the text from the document comprises extracting text from the document without using an embedding model.

20. An apparatus comprising:
at least one processing device configured to:
obtain, from a user, an input query associated with a document;
generate multiple prompts requesting that a first generative artificial intelligence (AD) model indicate whether different passages of the document are or are not relevant to the input query;
identify at least one specific passage in the document based on results generated by the first generative AI model using the multiple prompts;
extract text from the document, the extracted text including, for each specific passage, (i) the specific passage, (ii) a portion of text from the document preceding the specific passage, and (iii) a portion of text from the document following the specific passage;
generate an additional prompt requesting that the first generative AI model or a second generative AI model generate a response to the input query using the extracted text from the document; and
provide the response to the user by initiating display of the response;
wherein, to generate the multiple prompts, the at least one processing device is configured to:
generate first prompts;
identify relevant chunks based on results generated by the first generative AI model using the first prompts; and
iteratively generate additional prompts and identify relevant chunks based on results generated by the first generative AI model using the additional prompts until the identified relevant chunks have a size that is less than or equal to a specified threshold size.

* * * * *